(12) United States Patent
Espinoza et al.

(10) Patent No.: US 10,853,814 B2
(45) Date of Patent: Dec. 1, 2020

(54) SYSTEMS AND METHODS FOR MONITORING ATTENDANCE OF PERSONS VIA PAYMENT NETWORKS

(71) Applicant: MASTERCARD INTERNATIONAL INCORPORATED, Purchase, NY (US)

(72) Inventors: Cesar Espinoza, Miami, FL (US); Michelle Rubio, Miami, FL (US); Matias Sevi, Aventura, FL (US); Oscar A. Jimenez, Miami, FL (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 297 days.

(21) Appl. No.: 15/477,462

(22) Filed: Apr. 3, 2017

(65) Prior Publication Data
US 2018/0285873 A1 Oct. 4, 2018

(51) Int. Cl.
*G06Q 20/40* (2012.01)
*G06Q 30/02* (2012.01)

(52) U.S. Cl.
CPC ........... *G06Q 20/405* (2013.01); *G06Q 30/02* (2013.01); *G06Q 30/0215* (2013.01)

(58) Field of Classification Search
CPC ... G06Q 20/405; G06Q 30/02; G06Q 30/0215
See application file for complete search history.

(56) References Cited

U.S. PATENT DOCUMENTS

| | | | |
|---|---|---|---|
| 2005/0194357 A1* | 9/2005 | Liu | C09K 3/1463 216/88 |
| 2007/0280269 A1* | 12/2007 | Rosenberg | G06Q 30/02 370/399 |
| 2008/0015884 A1* | 1/2008 | Jamula | G06Q 10/08 705/330 |
| 2008/0153511 A1 | 6/2008 | Mock | |
| 2011/0196784 A1 | 8/2011 | Newman et al. | |

(Continued)

OTHER PUBLICATIONS

Dialog file 810: Business Wire. Leukemia Society: Cocktail Party to Benefit Lindsey Smith—10 year old Leukemia Patient Byline: News/assignment/lifestyle editors/health/medical writers. (Year: 1997).*

*Primary Examiner* — Raquel Alvarez
(74) *Attorney, Agent, or Firm* — Harness, Dickey & Pierce, P.L.C.

(57) ABSTRACT

Systems and methods are provided for monitoring attendance of people at organizer events, via payment networks, based on authorization messages generated in connection with such attendance. One exemplary method includes identifying an authorization message as an attendance message based on a program code included in the authorization message, where the authorization message further includes an organizer identifier indicative of an organizer associated with a location of the attendance. The method also includes identifying a person associated with the attendance based on the authorization message, and appending an attendance entry to an attendance profile associated with the person, based on the authorization message, whereby an incentive associated with the attendance of the person at the organizer is able to be allocated.

20 Claims, 3 Drawing Sheets

(56) References Cited

U.S. PATENT DOCUMENTS

| | | | |
|---|---|---|---|
| 2012/0123915 A1 | 5/2012 | Risnoveanu et al. | |
| 2013/0302767 A1* | 11/2013 | Hipskind | G09B 19/00 |
| | | | 434/238 |
| 2014/0343994 A1* | 11/2014 | Graff | G06Q 10/1095 |
| | | | 705/7.19 |
| 2017/0109836 A1* | 4/2017 | Somerville | G06Q 40/125 |

* cited by examiner

SYSTEMS AND METHODS FOR MONITORING ATTENDANCE OF PERSONS VIA PAYMENT NETWORKS

FIELD

The present disclosure generally relates to systems and methods for monitoring attendance of persons via payment networks, and in particular, to systems and methods for generating and transmitting authorization messages for such attendance to payment networks, and further for tracking the attendance of the persons based on the authorization messages, via the payment networks, by which incentives may then be provided and/or other actions taken.

BACKGROUND

This section provides background information related to the present disclosure which is not necessarily prior art.

Consumers are known to use payment accounts to fund transactions for different types of products (e.g., goods and services, etc.), from different merchants. When performed, such payment account transactions rely on payment networks to facilitate interactions between acquirers and issuers to approve the transactions, and then settle and clear the approved transactions. The interactions often rely on various messages (e.g., authorization messages, etc.) provided to the payment networks, where such messages often comply with certain standards such as, for example, the ISO 8583 message format for financial transactions.

Separately, students are known to attend schools from a young age and into their late teens or early twenties, or even later/longer. The education gained by the students is often associated with the students' attendance at such schools, where better attendance generally results in the students gaining more education. Attendance is often tracked, and enforced, by the schools, consistent with requirements under which the schools operate (e.g., as defined by law or regulation, etc.). Failure of the students to abide by, and fulfill, the attendance requirements of the schools may result in discipline of the students (and, potentially, their parents). Additionally, schools are also known to be associated with disbursement programs, through which students associated with the schools, and/or parents of the students, are able to receive monetary incentives for such attendance. It should further be appreciated that attendance, and incentivizing such attendance, are not issues limited to schools/students, but are also related to other aspects/relationships, such as for example, employer/employee work environments, etc.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Many persons are required, or encouraged, to attend one or more events, for purposes related to work, education, service, etc. The persons may sign into the events, or may be subject to attendance verification, for example, through roll calls or time cards, etc. Uniquely, the systems and methods herein provide an attendance solution for such events, which utilizes aspects of payment networks, so that payment network messaging may be used to gather and store attendance data for such events for use in monitoring attendance. In particular, for example, a person (e.g., a student, a teacher, an employee, a season pass holder, etc.) may enter an event (e.g., a school, work, a resort, etc.) through a tag enabled entrance, whereby an identifier associated with the person is captured and compiled into a payment network message (e.g., an authorization request, etc.). In turn, the event transmits the message to an attendance engine, which upon receipt of the message, records, as appropriate, the person's attendance at the event. In addition, the attendance engine may provide reporting of attendance at the event, per person (or, where the attendance engine is used for multiple events, per event), to an administrator or another associated with the event, whereby positive or negative remedial action may be imposed based on the attendance. For example, an administrator may award one or more incentives, potentially, through the payment network, to the person or someone associated with the person (e.g., a guardian, etc.) when the person's attendance at the event satisfies one or more defined thresholds. In this manner, attendance at the event is not only positively encouraged but is also identified to the particular person, thereby potentially improving attendance at the event and minimizing fraudulent receipt of resulting incentives.

Figure 1:
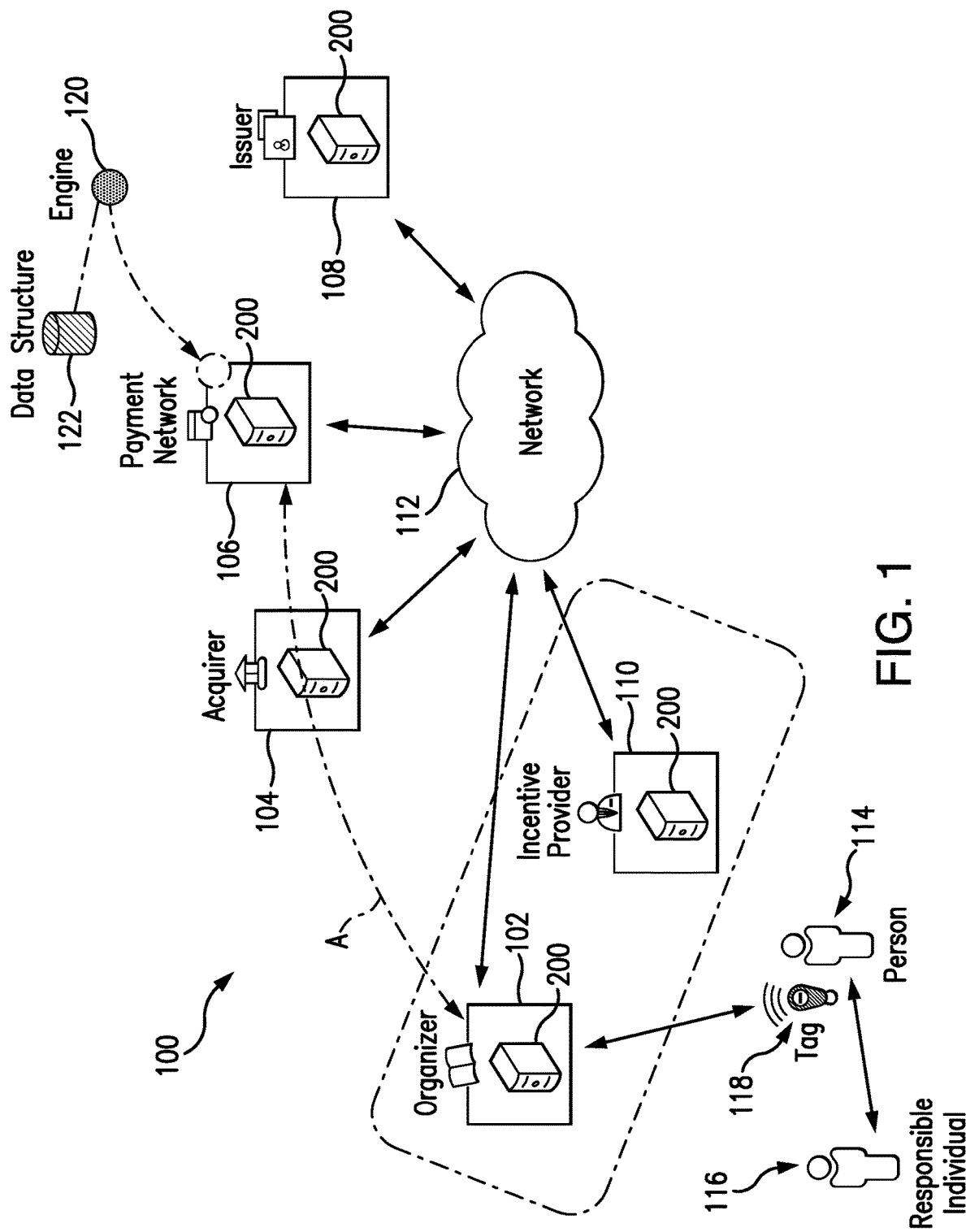
FIG. 1 is a block diagram of an exemplary system of the present disclosure suitable for use in monitoring attendance of persons via payment networks.

FIG. 1 illustrates an exemplary system 100 in which the one or more aspects of the present disclosure may be implemented. Although the system 100 is presented in one arrangement, other embodiments may include the parts of the system 100 (or other parts) arranged otherwise depending on, for example, implementation of attendance incentives in the system 100, relationships between different parts of the system 100 (e.g., in connection with generating, transmitting, receiving, etc. payment network messages; etc.), etc.

As shown in FIG. 1, the illustrated system 100 generally includes an organizer 102, an acquirer 104, a payment network 106, an issuer 108, and an incentive provider 110, each coupled to (and in communication with) network 112. The network 112 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 112 may include multiple different networks, such as a private payment transaction network made accessible by the payment network 106 to the acquirer 104 and the issuer 108 (and typically used to process payment account transactions between consumers and merchants)

and, separately, the public Internet, which may provide interconnection between the organizer 102, the payment network 106, and the incentive provider 110, etc.

In the exemplary embodiment, the organizer 102 defines and/or is involved with the attendance of persons, such as, for example, a person 114, at a location or locations of an event. It should be appreciated that the organizer 102 may include any suitable entity that requires or desires or invites attendance of the person 114 at a location/event. And, as such, the person 114 may include any person that is desired or obligated or invited, etc. to attend the location/event. Thus, as used herein, the organizer 102 and the person 114 may include any suitable organizer-person arrangement, where the person 114 is desired or obligated or invited, in one form or another, to attend locations, events, hours, shifts, programs, appointments, etc., set by or desired by the organizer 102. In connection therewith, the organizer 102 may collect various data from the person 114 relating to attendance (e.g., days present at the organizer, days absent from the organizer, etc.) and/or performance (e.g., performance reviews, grades, services used at a resort, hours of attendance at a theme park, hours worked, rides boarded at a theme park, particular terrain skied at a ski resort, etc.) at the organizer 102 and store such data in a data structure associated with the organizer 102. In various embodiments, the person 114 may be prompted to agree to legal terms associated with their relationship with the organizer 102 whereby the person 114 may voluntarily agree, for example, to allow the organizer 102 to collect such data and use the data, subsequently, in general and for one or more of the different purposes described herein.

As an example, the organizer 102 may include a school, and the person 114 may then include a student attending the school and/or a teacher employed at the school (such that the person 114 may be either the student or the teacher). In this example, the school may be provided to offer education to the student, which is provided by the teacher. Further in this example, the school often defines, or at least attempts to impose, attendance policies for the student and the teacher at the school (e.g., the student may be required to attend at least 180 days of school in a school year (subject to excused absences), or a different number of days, depending on, for example, a grade level, a location of the school; the teacher (as an employee of the school) may be required to attend at least 200 work days per calendar year, subject to vacation, holidays, and/or absences, etc.).

As another example, the organizer 102 may include an employer, and the person 114 may then include an employee that works for the employer (e.g., an employee at a factory, an employee at a fast food restaurant, a salesperson at a retail merchant, etc.). In this example, the employee may be required to work a certain amount of time for the employer (e.g., from 9 AM to 5 PM, Monday to Friday, etc.) or satisfy certain performance goals (e.g., achieve certain sales quotas, etc.), in exchange for compensation. In so doing, the employee may punch-in (e.g., punch a time clock, scan an ID, sign in or login to an account, etc.) when arriving at work, thereby indicating his/her presence at work, and punch-out when leaving work, thereby indicating his/her departure. Or, the employee may scan an ID to record certain sales.

As still another example, the organizer 102 may include a theme park or other resort (e.g., a ski resort, etc.), and the person 114 may include a patron of the theme park or other resort. In this example, the theme park or other resort may issue (e.g., sell, award, etc.) a pass to the patron that enables the patron to attend the theme park or other resort and use various facilities, services, etc. provided thereby (e.g., access a ride, board a chair lift, etc.). In turn, the theme park or other resort may monitor and/or track attendance of the patron and provide rewards for such attendance.

With that said, it should again be appreciated that the organizer 102 and/or the person 114 are not limited to the particular examples provided herein, but may include any organizer-person relationship or arrangement within the scope of the present disclosure that, for example, tracks attendance, absenteeism, performance, job completion, service usage, etc., linked to a physical location or place. As such, and as stated above, the organizer 102 may include any suitable entity that requires or desires or invites attendance of the person 114 at a location/event. And, the person 114 may include any person that is desired or obligated or invited, etc. to attend the location/event.

Referring again to FIG. 1, the incentive provider 110 is associated with the organizer 102, in connection with attendance of the person 114 at an event of the organizer 102 (e.g., in connection with providing incentives to the person 114 or others for attendance at the organizer 102, etc.). For example, the incentive provider 110 may include one or more government agencies, other public or private entities, etc., that has an interest or obligation in the attendance of the person 114 at the organizer 102. Further, while the incentive provider 110 is illustrated as separate from the organizer 102 in the system 100, it should be appreciated that the organizer 102 and the incentive provider 110 may be integrated into a single entity in other system embodiments herein (as indicated by the dotted lines in FIG. 1).

In certain instances, the incentive provider 110 is configured to provide assistance to the organizer 102, for example, in setting policies, rules, curriculum, etc. In connection therewith, when the policies, rules, curriculum, etc. are implemented, followed, satisfied, etc., the incentive provider 110 may be configured to then provide an incentive (e.g., a monetary incentive, a product incentive, a use incentive (e.g., free or discounted admission to a resort, etc.), another incentive (e.g., an extra vacation day for an employee, etc.), etc.) to one or more of the organizer 102, the person 114 (when the person 114 satisfies one or more of the implemented policies, rules, curriculum requirements, etc.), and a responsible individual 116 associated with the person 114 (e.g., a parent, guardian, relative, etc.) in connection with one or more incentive programs (e.g., associated with a particular incentive program code, etc.). When the incentives include monetary incentives, the incentive provider 110 may be configured to further provide the incentives to accounts (e.g., payment accounts (e.g., prepaid accounts, etc.), etc.) associated with the organizer 102, the person 114, and/or the responsible individual 116 receiving the incentive (where, in the illustrated embodiment, the accounts are issued by the issuer 108). In one or more embodiments, the accounts may be limited, by the incentive provider 110 and/or the issuer 108, to a merchant (or merchants) of a particular type or of particular types (e.g., a merchant associated with food, a merchant associated with school supplies, a public transportation merchant, a merchant associated with an education event, a merchant associated with particular cultural events, etc.). However, it should again be appreciated that other incentives may be provided in various forms by the incentive provider 110, such that the incentives are not limited to monetary payments to the person or the responsible individual 116, are not limited to monetary payments to accounts, etc.

With reference to the above example where the organizer 102 includes the school and the person 114 includes the student at the school, the incentive provider 110 may be configured to define the attendance policies for students at the school and then, potentially, provide incentives to the student (or those associated with the student) based on, for example, whether the attendance policy is followed and whether a threshold associated with the attendance policy is satisfied (e.g., attendance for students at the school is at least 90%, etc.; attendance for the particular student is at least 95%, etc.). The incentives may include, for example, monetary payments to the student and/or a responsible individual associated with the student, such as a parent, legal guardian, caregiver, or another person responsible for and/or associated with the student. In particular in this example, when the student satisfies the attendance policy, the incentive provider 110 is configured to provide a monetary payment (broadly, an incentive) to a payment account associated with the responsible individual of the student (issued to the individual by the issuer 108). The monetary payment may be representative of one or more of each day of attendance by the student at the school, each perfect week of attendance, attendance for a defined interval satisfying a threshold (e.g., for a week interval or other defined term, etc.), etc.

With reference again to FIG. 1, the person 114 is associated with a tag 118, which may include a variety of devices suitable to interact with the organizer 102 and to identify the person 114. For example, the tag 118 may include a device configured to emit/transmit data relating to the person 114, as described herein (including, in some embodiments, a smartphone or tablet, etc.). The tag 118 may alternatively include a device having data included thereon relating to the person 114, which can be read or otherwise received and understood by another computing device.

In particular, for example, in the system 100 the tag 118 (regardless of form) is configured to interact with the organizer 102 at one or more entrances at the organizer 102 (or at other locations of the organizer 102 (e.g., locations not specifically associated with entrances such as offices, classrooms, chair lifts, rides, etc.), to provide an indicator or identifier associated with the person 114 upon the person entering and/or exiting the organizer 102 through the one or more entrances. In so doing, the identifier associated with the person 114 is delivered, read and/or understood by the organizer 102. With that said, the tag 118 may include, without limitation, a radio frequency identifier (RFID) tag, a Bluetooth® tag, a quick response (QR) code, a barcode, network-communication capability (e.g., such as where the tag 118 includes a smartphone, etc.), or other suitable tag, code, or indicia for providing the identifier associated with the person 114. In some embodiments, the tag 118 may also (or alternatively) include an EMV chip (e.g., with the tag 118 being in the form of an identification card, a wrist band, etc.), which relies on the EMV standard developed by Europay®, MasterCard® and Visa® for payment devices. The EMV technical standard, which can be found at http://www.emvco.com, and involves the generation and inclusion of dynamic digital data in each transaction.

The tag 118 may further include information about the person 114 (e.g., the identifier associated with the person 114, etc.). The tag 118 may further permit the person 114 to use the tag 118 to perform purchase transactions (e.g., involving incentives provided by the incentive provider 110, or independent of any incentives provided by the incentive provider 110, etc.), etc. Further, in some embodiments, the tag 118 may include, or may be representative of herein (such that the tag 118 may or may not be a physical device), biometrics associated with the person 114, which can be scanned upon attendance of the person 114 at the organizer 102 and then associated with an identifier for the person 114. Or, in these embodiments, the biometrics may be considered the identifier of the person 114 (such that the tag 118 could potentially be omitted). In the above example relating to the school, the student may include a student identification tag with a RFID, and the school may be configured to read and/or query the tag 118 each time the student enters and/or leaves the school via suitable RFID scanners/receivers.

While only one organizer 102, one acquirer 104, one payment network 106, one issuer 108, and one incentive provider 110 are illustrated in FIG. 1, it should be appreciated that any number or type of these entities (and their associated components) may be included in the system 100, or as a part of other system embodiments, consistent with the present disclosure. Likewise, it should be appreciated that the system 100 and other system embodiments will generally include multiple persons 114, responsible individuals 116, and/or tags 118, whereby the attendance of the multiple persons 114 and/or the provision of incentives thereto is subject to the systems and methods herein. Further, in some embodiments, the system 100 may include one or more persons 114, but no responsible individuals 116 (e.g., in embodiments where the person 114 is responsible for himself/herself, etc.).

Figure 2:
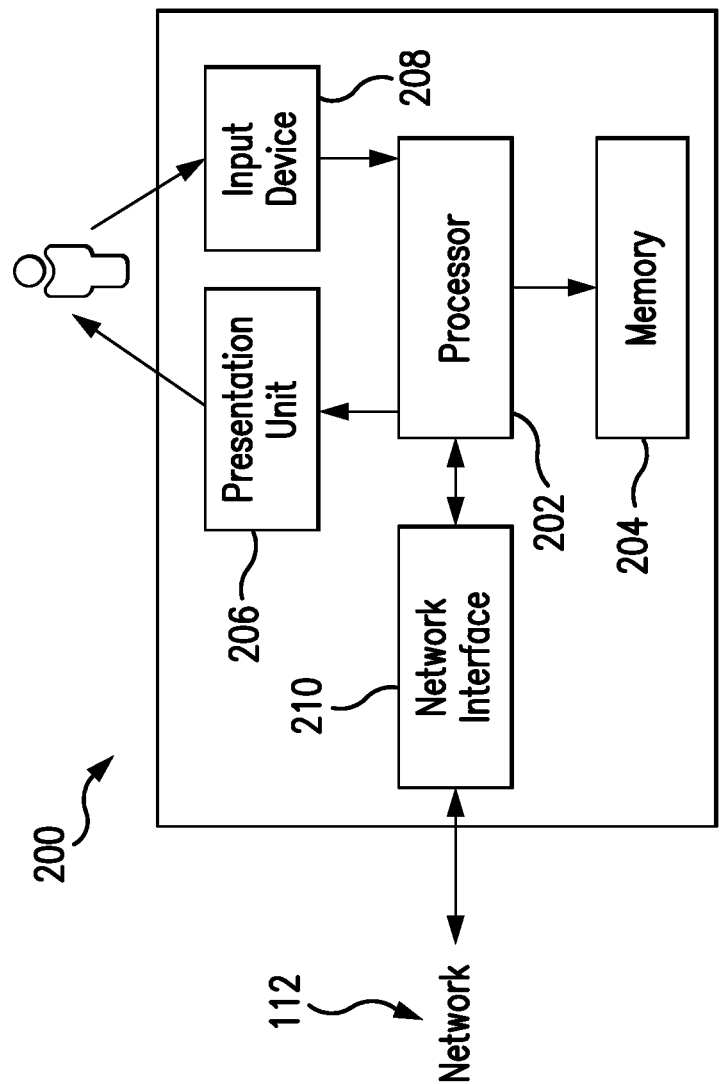
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, PDAs, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the organizer 102, the acquirer 104, the payment network 106, the issuer 108, and the incentive provider 110 are illustrated as including, or being implemented in, computing device 200, coupled to (and in communication with) the network 112. In addition, in various embodiments, the tag 118 may be considered, or may be implemented in, a computing device consistent with computing device 200. However, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc. to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, personal identifiers for persons herein, program codes, dates/times, country codes, organizer identifiers, attendance entries and/or profiles, account numbers (e.g., bank identification numbers (BINs), primary account numbers (PANs), etc.), performance content for persons in the system 100, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the functions or processes described herein.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information (e.g., attendance profiles, performance content, etc.), visually, for example, to a user of the computing device 200, such as the person 114 in the system 100, the responsible individual 116 in the system 100, users associated with one or more of the organizer 102 and the incentive provider 110, etc. And, various interfaces (e.g., as defined by network-based applications (e.g., websites, etc.), etc.) may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

In addition, the computing device 200 includes an input device 208 that receives inputs from the user (i.e., user inputs) such as, for example, registration inputs and/or performance content for the person 114, or other inputs such as personal identifiers, etc. received/scanned from tags (e.g., from tag 118, etc.), etc. The input device 208 may include a single input device or multiple input devices. The input device 208 is coupled to (and is in communication with) the processor 202 and may include, for example, one or more of a keyboard, a pointing device, a mouse, a stylus, a RFID reader, a touch sensitive panel (e.g., a touch pad or a touch screen, etc.), another computing device, and/or an audio input device. In addition, in various exemplary embodiments, a touch screen, such as that included in a tablet, a smartphone, or similar device, behaves as both a presentation unit and an input device.

Further, the illustrated computing device 200 also includes a network interface 210 coupled to (and in communication with) the processor 202 and the memory 204. The network interface 210 may include, without limitation, a wired network adapter, a wireless network adapter (e.g., a near field communication (NFC) adapter, a Bluetooth adapter, etc.), an RFID reader, a mobile network adapter, or other device capable of communicating to one or more different networks, including the network 112.

Referring again to FIG. 1, the system 100 includes an attendance engine 120, which is specifically configured, by computer executable instructions, to perform one or more of the operations described herein. In the illustrated embodiment, the attendance engine 120 is provided as a separate part of the system 100 and is in communication with the payment network 106, for example. As such, the attendance engine 120 may be considered a computing device consistent with computing device 200. However, as indicated by the dotted line in FIG. 1, the attendance engine 120 may alternatively be incorporated, at least partly or entirely, into the payment network 106. Further, it should be appreciated that the attendance engine 120 may be associated with, or incorporated with, other parts of the system 100, in other embodiments, including, for example, the organizer 102, the issuer 108, and/or the incentive provider 110, etc. In addition, while the system 100 is illustrated as including only one attendance engine 120, it should be appreciated that multiple such attendance engines may be included in the system 100 in other embodiments, whereby the multiple attendance engines may operate, as described herein, in cooperation together, or separately, for the person 114, or for multiple persons (e.g., for multiple students at a school, for multiple employees at an employer, for multiple patrons at a resort, etc.). When such multiple attendance engines 120 are included, the operations described herein as executed by the attendance engine 120 may, in some embodiments, be segregated between the multiple engines, located either together or distributed over a geographic region.

The system 100 also includes an attendance data structure 122, which is coupled to (and is in communication with) the attendance engine 120. The attendance data structure 122 includes profiles for multiple persons (e.g., attendance profiles, etc.), including the person 114. The attendance data structure 122 may be a standalone part of the system 100 as shown in FIG. 1, or it may be included in memory of the attendance engine 120 (e.g., memory 204, etc.) or elsewhere in the system 100. Likewise, it should be understood that in certain embodiments the attendance data structure 122 may be divided into separate structures, stored at separate parts of the system 100 and accessed from separate locations.

Generally in the system 100, the attendance engine 120 is configured to register the person 114 and/or the responsible individual 116 to the engine 120. In particular, the attendance engine 120 is configured to provide one or more interfaces (e.g., electronic forms, etc.) to the person 114 and/or the responsible individual 116, at a computing device 200 associated therewith, whereby the attendance engine 120 is configured to collect registration information for the person 114 (e.g., name, address, school name, school location, guardian name, incentives, incentive threshold(s), attendance requirement(s), etc.) and generate a profile for the person 114. The attendance engine 120, through the one or more interfaces, may be configured to then further collect performance data for the person 114 (in addition to the attendance data already collected), either directly from the person 114 (and/or the responsible individual 116) or from the organizer 102 (e.g., from a data structure associated with the organizer 102 comprising such data for the person 114, etc.), and append such data to the profile for the person 114. In the above example where the person 114 is the student and the organizer 102 is the school, the performance data for the student may include, but is not limited to, grades, performance on standardized tests, grade point average (GPA), etc. Alternatively, where the person 114 is a teacher at the school, the performance data may include, but is not limited to, an attendance rate of the teacher's students, performance of the teacher's students on standardized tests, and average GPA of the teacher's students, a timeliness of the teacher submitting grades/reports, etc. Further, in the above example where the person 114 is the employee and the organizer 102 is the employer, the performance data for the employee may include, but is not limited to, performance reviews, performance results (e.g., sales results, etc.), etc.

After the person 114 (and/or the responsible individual 116) is registered, the attendance engine 120 is configured to assign a personal identifier to the person 114. Once assigned, the personal identifier may be provided to the person 114 within, programmed into, and/or associated with the tag 118 (or, in some embodiments, even associated with a biometric of the person 114 such that the person 114 can be identified as described herein upon scanning of his/her biometric).

Separately in the system 100, the person 114 is expected to, and does, attend the organizer 102, consistent with one or more attendance policies, requirements, etc. Upon the person 114 entering the organizer 102 (e.g., via an entrance, upon entering the premises of the organizer 102, etc.), the organizer 102 is configured to detect the person 114 by the tag 118 (e.g., via a suitable scanner, etc.) and to generate an authorization message for the person 114. The organizer 102 is further configured to then transmit the authorization request to the payment network 106 (such as, for example, to the network operated by Mastercard International Incorporated, the assignee of the present disclosure), via the acquirer 104 (e.g., via a banking institution, a pseudo acquirer, etc. capable of communicating with the payment network 106 when the organizer 102 is not able to do so, etc.), generally along path A in FIG. 1. In various embodiments, the acquirer 104 may be omitted from the system 100, when the organizer 102 is capable of communicating with, for example, sending authorization messages to, etc., the payment network 106.

The authorization message generated by the organizer 102 in connection with the attendance of the person 114 at the organizer 102 includes various information about the person 114 and the associated access by the person 114 at the organizer 102. For example, the authorization message may include, without limitation, a program code for a program provided by the incentive provider 110 to the person 114, the personal identifier assigned to the person 114, an organizer identifier for the organizer 102 (as provided by the organizer 102 in generating the message), a name of the organizer 102, a date/time of the attendance, a country code for the organizer 102, and performance content for the person 114 at the organizer 102 (e.g., when available, when desired to be included (e.g., based on a particular schedule for including such data, etc.), etc.), etc. In addition in this embodiment, the authorization message is compliant with the ISO 8583 standard for financial transaction messages. As such, the message may be easily transmitted through the private payment transaction network provided by the payment network 106 (and typically used to process payment account transactions performed between consumers and merchants), by entities capable of communicating with the payment network 106. Uniquely, the above information included in the authorization message relating to the person 114 and the associated access by the person 114 at the organizer 102 may be segregated into one or more different data elements (DE) associated with the authorization message in place of, or in lieu of, financial data typically included therein (but, in some embodiments, still in a similar format thereto). For example, the program code for the incentive program provided by the incentive provider 110 to the person 114 and the personal identifier for the person 114 may be included as a conventional PAN in the authorization message (e.g., so that the program code and the personal identifier can be included in a DE in the authorization message that traditionally includes the PAN for an account, etc.).

Once the authorization message for the attendance of the person 114 at the organizer 102 is provided to the payment network 106, by its association therewith, the attendance engine 120 is configured to identify the authorization message as an attendance message. Such identification may be based on the particular program code included in the authorization message, etc. In particular, for example, the payment network 106 may reserve a particular BIN 1234-56 as a program code associated with an attendance-reliant program provided by the incentive provider 110. As such, the attendance engine 120 is configured to identify the authorization message, based on the reserved BIN when included in the authorization message (e.g., in the DE traditionally comprising the PAN, etc.), as an attendance message for the program. Then, when the attendance engine 120 identifies the authorization message as an attendance message, the attendance engine 120 is configured to identify the person 114 to which the message relates, based on the personal identifier included in the authorization message (e.g., also in the DE traditionally comprising the PAN, etc.). To do so, the attendance engine 120 is configured to access the attendance data structure 122 and to search for the personal identifier. Then, when the person 114 and the profile associated with the person 114 is identified (since the person 114 is registered to the attendance engine 120, as described above), the attendance engine 120 is configured to compile an attendance entry for the person 114 (for the attendance of the person 114 at the organizer 102) and append the attendance entry to an attendance profile for the person 114, also in the data structure 122, based on the authorization message. The attendance entry may simply include an indication of the particular attendance of the person 114 at the organizer 102, or it may also include performance data for the person 114 when such data is included in the authorization message.

Subsequently, as the person 114 repeatedly attends the location and/or the event associated with the organizer 102, and as additional authorization messages for the person 114 are identified/received by the attendance engine 120, the attendance profile for the person 114 is updated to indicate the attendance for the person 114 over an interval, such as, for example, a week, a month, a calendar year, a school year, a season (e.g., a ski season, etc.), a quarter (e.g., a school quarter, a fiscal quarter for an employer, etc.), etc. In connection therewith, the attendance engine 120 may be configured to generate and transmit a report to the incentive provider 110, for example, indicating the person's attendance at the organizer 102. The report may also include performance data for the person 114, as described above. In turn, based on the report, the incentive provider 110 may allocate one or more incentives (e.g., monetary payments to a predefined account, etc.) for the person 114, when one or more attendance threshold(s) are satisfied. For example, the incentive provider 110 may initiate a payment account transaction (e.g., a fund transfer payment transaction via the payment network 106, etc.) to the account associated with the person 114 (or the responsible individual 116), whereupon the issuer 108 of the account allocates funds (consistent with the transaction) to the account.

Additionally, or alternatively, the attendance engine 120 may be configured to determine when the attendance of the person 114, as indicated by the attendance profile, satisfies one or more defined thresholds, as retrieved from the data structure 122 (and specific to the organizer 102, the incentive provider 110, etc.). Then, when the one or more defined thresholds are satisfied, the attendance engine 120 may be configured to cause a monetary payment to be allocated to, or to directly allocate the monetary payment to, the account associated with the person 114 or the responsible individual 116. For example, the attendance engine 120 may cause allocation of the monetary payment by initiating a payment account transaction (e.g., a fund transfer payment transaction via the payment network 106, etc.) to the account issued to the person 114 (or the responsible individual 116), whereupon the issuer 108 of the account allocates funds (consistent with the transaction) to the account.

Further, in some embodiments, the attendance engine 120 may also (or alternatively) transmit the report for the person 114 to the organizer 102 (indicating attendance of the person 114 at the organizer 102 and including performance data for the person 114 at the organizer, etc.). In turn, based on the report, the organizer 102 may provide one or more incentives to the person 114, and/or the organizer 102 may utilize the data in the report to implement various business decisions, change work schedules, change staffing numbers, measure and/or monitor performance of the person 114, etc. For example, regarding the above where the organizer 102 is an employer and the person 114 is an employee of the employer, the employee may be scheduled to work Monday to Friday for the employer from 6 AM to 2 PM. A report generated by the attendance engine 120 for the employee may then indicate that the employee has a 75% attendance rate and arrives to work on time only 50% of the time, but that the employee continuously receives positive performance reviews. In turn in this example, based on the report, the employer may modify the work schedule for the employee, for example, so that the employee instead works from 9 AM to 4 PM (e.g., to provide the employee additional time in the morning to arrive at work, etc.).

In various exemplary embodiments, the person 114 (and/or the responsible individual 116) involved in receiving incentives from the incentive provider 110 are also prompted to agree to legal terms associated with receiving such incentives, for example, during enrollment in corresponding incentive programs, etc. In so doing, the person 114 (and/or the responsible individual 116) may voluntarily agree, for example, to allow the incentive provider 110, or others, to use data collected and/or generated as described herein for subsequent use in general and for one or more of the different purposes described herein. Moreover, operations described herein and related to any monitoring and/or tracking of persons, as associated with the incentive program or otherwise, are intended to be carried out in compliance with applicable privacy laws and regulations, including notice and consent by the person 114, the responsible individual 116, and/or others.

Figure 3:
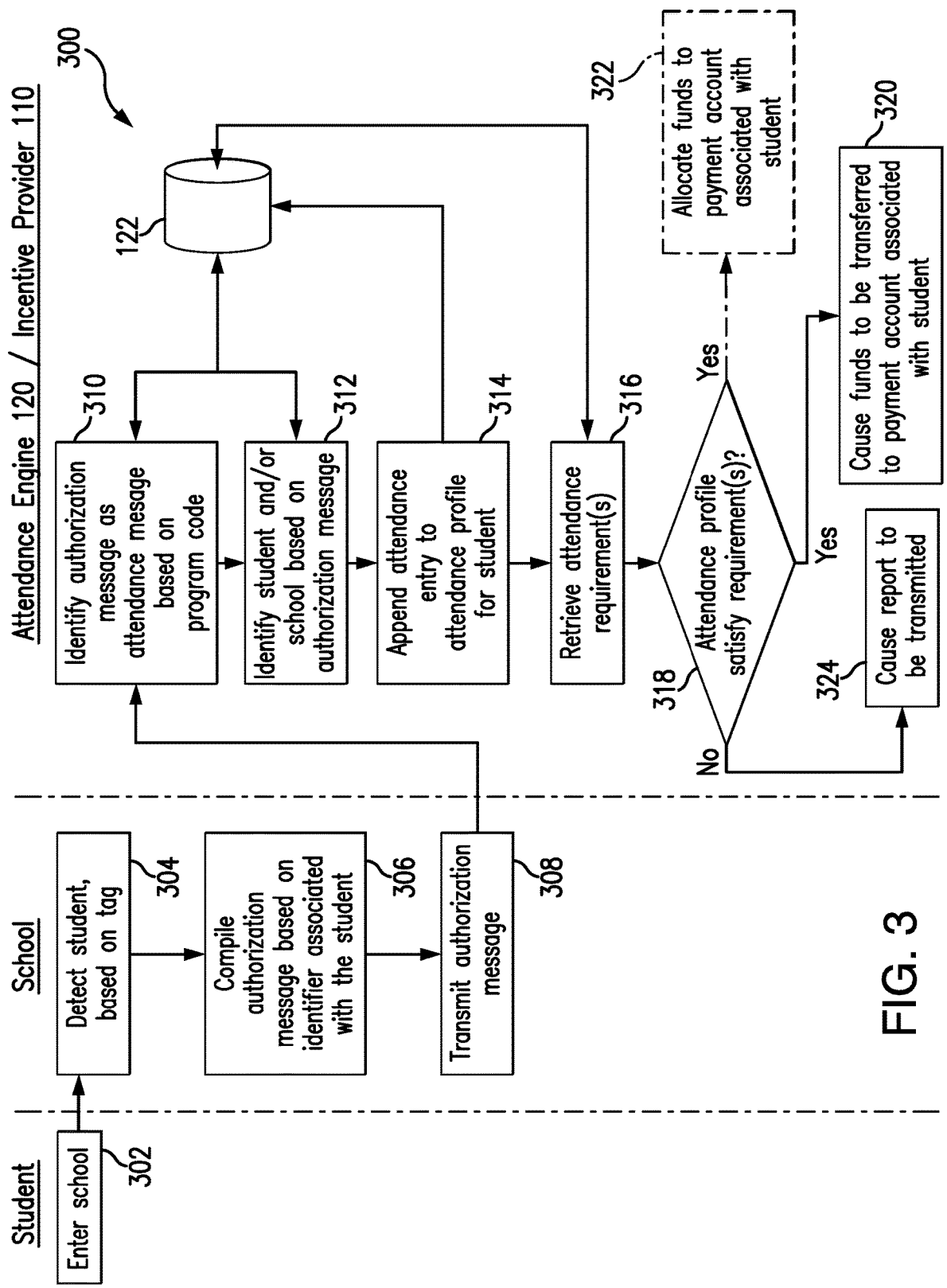
FIG. 3 is a flow diagram of an exemplary method, which may be implemented in connection with the system of FIG. 1, for use in monitoring attendance of a person at an event, such as, for example, a school, etc., via a payment network.

FIG. 3 illustrates an exemplary method 300 for use monitoring attendance of one or more persons at an organizer, via a payment network (e.g., again, via the network operated by MasterCard International Incorporated, the assignee of the present disclosure). The exemplary method 300 is described as implemented in the attendance engine 120 of the system 100, with further reference also made to the computing device 200. However, the methods herein should not be understood to be limited to the system 100 or the computing device 200, as the methods may be implemented in other systems and/or computing device. Moreover, the systems and the computing devices herein should not be understood to be limited to the exemplary method 300.

For purposes of illustration, the method 300 is described with reference to the person 114 being a student and the organizer 102 being a school. However, it should again be appreciated that the methods (and systems) herein are not limited to students and/or schools, as they are more generally applicable to various persons who may be subject to one or more attendance requirement(s), as imposed, indicated, desired, or otherwise associated with organizers of various types.

In the following description, the student, as described above, is registered with the attendance engine 120 and is assigned student identifier number 654321. In addition, the student is associated with tag 118 (e.g., which may include a bracelet, a necklace, a keychain, a smartphone, etc.) programmed and/or configured with the student identifier. Further, the incentive provider 110 provides an attendance-reliant social program to which the student is enrolled (such that the incentive provider 110 provides certain incentives to the student when various attendance thresholds by the student at the school are satisfied). And the program code associated with the attendance-reliant social program provided by the incentive provider 110 is 1234-56.

In the illustrated method 300, the student enters the school, at 302, by passing over/through a boundary associated with the school (e.g., passing through an entrance, entering a parking lot, crossing a property line, etc.). When entering the school, the tag 118 emits and/or transmits (e.g., via RFID, etc.) the student identifier associated with the student. And, upon such entry of the student to the school (with the tag 118), the school detects, at 304, the student identifier from the tag 118 (e.g., via computing device 200 (e.g., via the input device 208 and/or network interface 210, etc.), etc.). As described above in the system 100, it should again be appreciated that the student identifier may be emitted and/or transmitted from the tag 118, or retrieved from the tag 118 by the school (or otherwise retrieved by the school), by the computing device 200, in various other suitable manners.

Upon detecting the student identifier for the student, when the student enters the school, the school generates/compiles, at 306, an authorization message for the student (e.g., an authorization request, etc.). In this embodiment, the authorization message is compliant with the ISO 8583 standard for financial transaction messages. As such, in compiling the authorization message for the student, the school includes, among other things, the student identifier for the student and an identifier for the school in the authorization message (e.g., in one or more data elements of the authorization message, etc.). The authorization message may also include the social program code associated with the attendance-reliant social program provided by the incentive provider 110. In connection therewith, the social program code is generally previously provided by the incentive provider 110 to the school, so that the school can then include the code in the authorization message, as appropriate. However, it should be appreciated that the social program code may be obtained by the school in other manners, and then included in the authorization request (e.g., from the student when the student enters the school (e.g., directly from the student, from the tag 118, etc.), subsequently from the incentive provider 110 upon entry of the student to the school, etc.).

Table 1 illustrates various different data elements (DE) of the authorization message in which different information relating to the attendance of the student at the school may be included. For example, a time in/out associated with the student's access at the school may be included in DE 12 (e.g., 8:15 AM, etc.) and a date in/out associated with the student's access at the school may be included in DE 13 (e.g., March 1, etc.) (i.e., the time/day the tag 118 was detected). In addition, the organizer type (i.e., a school in this example) may be included in DE 18, a country in which the school is located may be included in DE 19, and a "PAN" for the school may be included in DE 20 (where, in this example, the "PAN" is a sixteen-digit number that includes a BIN associated with the social program code for the attendance-reliant social program provided by the incentive provider 110 to the student (i.e., 1234-56), the student identifier for the student (i.e., 654321-000, extended to nine digits so that the resulting PAN can still be sixteen digits), and a verification code or check-sum (i.e., 1), or in this example 1234566543210001). With that said, it should be appreciated that the data elements included in Table 1 are illustrative only and should not be understood to limit the method 300, or other methods herein (or the system 100 or other systems herein). It should also be appreciated that additional data elements may be included/utilized in the authorization message as needed, for example, to accommodate additional data having large sizes and not capable of fitting within one data element, to accommodate other data not illustrated in Table 1, etc.

TABLE 1

| Data Element (DE) | Authorization Message Content |
| --- | --- |
| DE 12 | Time In/Time out |
| DE 13 | Date In/Date out |
| DE 18 | Organizer Type (e.g., school, etc.) |
| DE 19 | Country of Organizer |
| DE 20 | PAN (e.g., comprising a 6 digit BIN associated with the social program code for the incentive provider 110, a 9 digit personal identifier for the student, and a 1 digit check/verification code) |
| DE 21 | Optional |
| DE 22 | Individual PIN for authentication (e.g., for authentication of the student, etc.) |
| DE 42 | Originator ID (e.g., school ID) |
| DE 43 | Organizer Name (e.g., school name) |
| DE 47 | Optional |
| DE 48 | Additional Information/Performance Data (e.g., a grade report for the student, etc.) |

Next in the method 300, the school 102 transmits, at 308, the authorization message to the payment network 106, via the acquirer 104. At the payment network 106, the authorization message is accessible to the attendance engine 120, which, in turn, identifies, at 310, the authorization message as being an attendance message. In particular, in this exemplary embodiment, the authorization message includes a "PAN" that consists of the BIN for the attendance-reliant social program provided by the incentive provider 110, the student identifier for the student, and the check digit (e.g., consistent with the Luhn algorithm as is known to one skilled in the art, etc.). As described above, the BIN for the attendance-reliant social program provided by the incentive provider 110 is specific to the program and is known to the attendance engine 120 as being associated with such program (e.g., via the attendance data structure 122 or otherwise, etc.). As such, when included in the authorization message, the attendance engine 120 understands the message to be an attendance message and not a traditional authorization message relating to a payment account transaction.

When the authorization message is identified as an attendance message, the attendance engine 120 further identifies, at 312, the student and/or the school based on the authorization message. In particular, as indicated above, the "PAN" in the authorization message includes the student identifier for the student, which is used by the attendance engine 120 to search in the attendance data structure 122 to identify the student (and his/her profile). Similarly, the school 102 is identified by the attendance engine 120 by searching in the data structure 122 for the school identifier and/or school name for the school (as also included in the authorization message). Then, based on the identified student and and/or identified school, the attendance engine 120 compiles an attendance entry for the student and appends, at 314, the attendance entry to an attendance profile, in the data structure 122, associated with the student. As described above, the attendance entry may include, for example, the date/time of the entry at the school by the student, the school identifier, the school name, a performance review for the student (e.g., a grade report, etc.), etc.

At one or more intervals, or continuously, after the attendance entry is appended to the attendance profile for the student, the attendance engine 120, in this exemplary embodiment, determines whether the attendance profile for the student satisfies one or more attendance requirements implemented by the incentive provider 110, for example. In so doing, the attendance engine 120 retrieves, at 316, the requirement(s) from the data structure 122, based on the school identifier, school name, etc. for the school and then determines, at 318, whether the attendance profile for the student satisfies the requirement(s). The requirement(s) may be general, or they may be associated with one or more particular incentives provided by the incentive provider 110. For example, the incentive provider 110 may provide a payment of $5.00 to the student for each day of attendance by the student at the school in excess of 150 days. As such, in this example, the attendance engine 120, at the 151-day period (and potentially each day thereafter), determines whether the student has attended the school in excess of 150 days.

With continued reference to FIG. 3, when the attendance engine 120 determines that the attendance requirement(s) for the student are satisfied, at 318, the attendance engine 120 causes funds to be transferred, at 320, to a payment account associated with the student. In particular, for example, the attendance engine 120 may initiate a payment account transaction to the student's payment account, via the incentive provider 110, where upon approval of the transaction by the issuer 108 of the payment account, the issuer 108 allocates the funds to the payment account. Alternatively, as indicated by the dotted lines in FIG. 3, the attendance engine 120 may transmit a report to the incentive provider 110 indicating that the student's attendance satisfies the attendance requirement(s) and, in turn, the incentive provider 110 may directly allocate, at 322, funds (e.g., transfer funds, etc.) to the student's payment account.

In various implementations of the method 300, when the attendance engine 120 determines that the attendance requirement(s) for the student are satisfied, at 318, the attendance engine 120 may alternatively (or in addition to causing funds to be transferred) transmit a report to one or more entities (e.g., the incentive provider 110 as described above, the organizer 102, etc.) indicating the student's attendance at the school. As indicated above, such reports may be generated at a particular period (e.g., at the 151-day period when the attendance requirement(s) are implicated at 150 days of attendance, etc.). Or, such reports may be generated at one or more regular intervals (e.g., daily, weekly, monthly, etc.). In turn, based on the report, the receiving entity may take one or more actions to address the attendance indicated therein (e.g., in the form of incentives, remedial actions, disciplinary actions, etc.).

With continued reference to FIG. 3, when the attendance engine 120 determines that the attendance requirement(s) for the student are not satisfied, at 318, the attendance engine 120 causes a report to be transmitted to one or more entities indicating the student's attendance at the school, at 324, without causing any fund and/or allocating any funds to the payment account associated with the student. It should be appreciated that the attendance engine 120 may further cause such a report indicating the student's attendance at the school to be transmitted to one or more entities, even when the attendance requirement(s) for the student are satisfied.

Further, in various implementations of the method 300, in connection with transmitting a report to one or more entities indicating the student's attendance at the school, the attendance engine 120 may also include performance data in the report. In particular, for example, when the school generates the authorization message for the student, when the student enters the school (indicating attendance of the student at the school), the school may also include grade data for the student in the authorization message. This may be done at particular intervals, such as when new grades are issued (e.g., at the end of a quarter, semester, etc.), or this may be done each time an authorization message is compiled. In any case, upon receipt of the authorization message at the attendance engine 120, the attendance engine 120 may retrieve the grade data from the message and include it in the report. The report may then be used by a receiving entity to measure performance of the student, of teachers associated with the student, of the school, etc.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) identifying an authorization message as an attendance message based on a program code included in the authorization message, the authorization message further including an organizer identifier indicative of an organizer associated with a location of the attendance; (b) identifying a person associated with the attendance based on the authorization message; and (c) appending an attendance entry to an attendance profile associated with the person, based on the authorization message, whereby an incentive associated with the attendance of the person at the organizer is able to be allocated.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for monitoring attendance of a person, the method comprising:
receiving, by a computing device, through an acquirer via a payment network, an authorization message compliant with an ISO standard for financial transaction messages, the authorization message including a plurality of data elements consistent with the ISO standard, one of the data elements including a value including (a) a program code associated with an incentive provider, (b) a personal identifier indicative of the person, and (c) a check digit, and one the data elements including an organizer identifier indicative of an organizer associated with a location of the attendance;
based on the program code included in the authorization message, identifying, by the computing device, the authorization message as an attendance message indicative of the attendance of the person at the location; and
when the authorization message is identified as the attendance message indicative of the attendance of the person at the location:
accessing, by the computing device, an attendance data structure including (a) a personal identifier for each of multiple people enrolled to receive incentives from the incentive provider in connection with attendance at the location associated with the organizer and (b) an attendance profile for each of the multiple people;
searching, by the computing device, the attendance data structure for the personal identifier included in the authorization message;
when the attendance data structure includes the personal identifier included in the authorization message, compiling, by the computing device, an attendance entry for the person associated with the personal identifier included in the authorization message, the attendance entry including at least an indication of the attendance of said person at the location associated with the organizer; and
appending, by the computing device, the attendance entry to the attendance profile associated with the person in the attendance data structure, thereby permitting allocation of an incentive associated with the attendance of the person at the organizer.

2. The computer-implemented method of claim 1, wherein the authorization message is compliant with the ISO 8583 standard for financial transaction messages and includes a DE20 data element for a payment account number, the DE20 data element including the value.

3. The computer-implemented method of claim 2, wherein the authorization message further includes a time and a date associated with the attendance of the person at the location associated with the organizer; and
wherein compiling the attendance entry includes compiling the attendance entry based on the time and/or the date included in the authorization message.

4. The computer-implemented method of claim 1, wherein the incentive associated with the attendance of the person at the location of the organizer includes a monetary incentive; and
further comprising allocating funds consistent with the monetary incentive to a payment account associated with the person or an individual responsible for the person, based on the attendance profile associated with the person.

5. The computer-implemented method of claim 4, wherein allocating funds to the payment account associated with the person or an individual responsible for the person is based on the attendance profile associated with the person satisfying a defined threshold.

6. The computer-implemented method of claim 1, wherein the authorization message further includes performance content related to the person; and
further comprising appending, by the computing device, the performance content to the attendance profile associated with the person.

7. The computer-implemented method of claim 1, further comprising:
detecting an electronic tag upon attendance of the person at the location associated with the organizer;
compiling the authorization message consistent with the ISO standard for financial transaction messages, the authorization message including at least the program code, the organizer identifier indicative of the organizer, and the identifier indicative of the person; and
transmitting the authorization message to the payment network.

8. The computer-implemented method of claim 7, wherein the authorization message further includes a time and a date associated with the attendance of the person at the location associated with the organizer; and
wherein compiling the attendance entry includes compiling the attendance entry based on the time and/or the date included in the authorization message.

9. The computer-implemented method of claim 8, further comprising allocating funds to a payment account associated with the person or an individual responsible for the person, based on the attendance profile associated with the person.

10. The computer-implemented method of claim 9, wherein
the organizer includes a school;
the person includes a student attending the school; and
the responsible person includes a guardian of the student.

11. The computer-implemented method of claim 1, wherein the program code associated with an incentive provider, the personal identifier indicative of the person, the check digit, and the organizer identifier indicative of an organizer are included in the same data element.

12. A system for monitoring attendance of a person at an organizer, the system comprising:
a memory comprising an identifier for each of multiple people enrolled to receive incentives from an incentive provider in connection with attendance at an organizer, and an attendance profile for each of the multiple people indicative of attendance by the person at the organizer; and
a processor in communication with the memory, the processor configured to:
receive, via a payment network, an authorization message compliant with an ISO standard for financial transaction messages, the authorization message including a plurality of data elements consistent with the ISO standard, one or more of the data elements including: (a) a program code associated with the incentive provider and (b) a personal identifier indicative of a person;
identify the authorization message as an attendance message based on the program code included in the authorization message;
identify the person, in the memory, as one of the multiple people enrolled to receive incentives from the incentive provider in connection with attendance at the organizer, based on the personal identifier;

append an attendance entry to the attendance profile for the person in the memory, based on the attendance of the person at the organizer indicated in the authorization message, whereby an incentive provided by the incentive provider and associated with the attendance of the person at the organizer is able to be allocated to the person;

after appending the attendance entry to the attendance profile for the person, compare the attendance profile to a defined threshold; and when the attendance profile satisfies the defined threshold, cause the incentive associated with the attendance of the person at the organizer to be allocated to the person.

13. The system of claim 12, wherein the authorization message includes an account number, the account number including the program code, the personal identifier associated with the person, and a check digit.

14. The system of claim 12, wherein the processor is further configured to:

compile a report for the person based on the attendance profile for the person; and transmit the report to one or both of the incentive provider and the organizer.

15. The system of claim 14, wherein the authorization message further includes performance content related to the person in connection with the organizer; and wherein the processor is further configured to append the performance content to the attendance profile for the person.

16. The system of claim 15, wherein the report includes attendance data for the person at the organizer and the performance content related to the person.

17. The system of claim 12, wherein the authorization message further includes an organizer identifier indicative of the organizer; and wherein the processor is further configured to retrieve the defined threshold from the memory based on the organizer identifier included in the authorization request.

18. A non-transitory computer-readable storage media including computer-executable instructions for monitoring attendance of a person at an organizer, which, when executed by a processor, cause the processor to:

access, via a payment network, an authorization message generated by an organizer, the authorization message compliant with an ISO standard for financial transaction messages, the authorization message including a plurality of data elements consistent with the ISO format, one of the data elements including at least: (a) a program code associated with an incentive provider and (b) a personal identifier indicative of a person, and one of the data elements including at least an organizer identifier indicative of an organizer, the incentive provider configured to provide incentives to multiple people based on attendance at a location associated with the organizer;

identify the authorization message as an attendance message based on the program code included in the authorization message;

identify the person, based on the personal identifier in the authorization message, as one of the multiple people for receiving an incentive from the incentive provider in connection with attendance of the person at the organizer;

compile an attendance report for the person based on the attendance of the person at the organizer; and transmit the attendance report to one or both of the incentive provider and the organizer.

19. The non-transitory computer-readable storage media of claim 18, wherein the authorization message further includes a check digit in one of the data elements and performance content related to the person in connection with the organizer; and wherein the report includes attendance data for the person at the location associated with the organizer and the performance content related to the person.

20. The non-transitory computer-readable storage media of claim 18, wherein the executable instructions, when executed by the processor, further cause the processor to cause the incentive associated with the attendance of the person at the location of the organizer, as provided by the incentive provider, to be allocated to the person.

* * * * *